United States Patent
Alba et al.

(10) Patent No.: US 11,068,376 B2
(45) Date of Patent: Jul. 20, 2021

(54) ANALYTICS ENGINE SELECTION MANAGEMENT

(71) Applicant: International Business Machines Corporation, Armonk, NY (US)

(72) Inventors: Alfredo Alba, Morgan Hill, CA (US); Clemens Drews, San Jose, CA (US); Daniel F. Gruhl, San Jose, CA (US); Linda H. Kato, San Jose, CA (US); Christian B. Kau, Los Altos, CA (US); Neal R. Lewis, San Jose, CA (US); Pablo N. Mendes, San Francisco, CA (US); Meenakshi Nagarajan, San Jose, CA (US); Cartic Ramakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 15/456,496

(22) Filed: Mar. 11, 2017

(65) Prior Publication Data
US 2018/0260459 A1  Sep. 13, 2018

(51) Int. Cl.
G06F 11/34 (2006.01)
G06F 16/25 (2019.01)
G06F 16/2452 (2019.01)

(52) U.S. Cl.
CPC ...... *G06F 11/3452* (2013.01); *G06F 11/3409* (2013.01); *G06F 16/24522* (2019.01); *G06F 16/258* (2019.01)

(58) Field of Classification Search
CPC .......................... G06F 11/3409; G06F 11/3452
See application file for complete search history.

(56) References Cited

U.S. PATENT DOCUMENTS

| 7,788,198 | B2 * | 8/2010 | Liu ..................... G06F 11/3452 706/45 |
| 8,051,084 | B2 * | 11/2011 | Tunkelang ............ G06F 16/245 707/737 |
| 8,743,134 | B2 | 6/2014 | Brugler et al. |
| 8,838,510 | B2 | 9/2014 | Baughman et al. |
| 9,058,409 | B2 * | 6/2015 | Chakra ................. G06F 16/904 |
| 2003/0229470 | A1 | 12/2003 | Pejic |

(Continued)

OTHER PUBLICATIONS

Ali et al.; "Active Learning with Model Selection"; Association for the Advancement of Artificial Intelligence; 2014. <https://www.microsoft.com/en-us/research/publication/active-learning-model-selection/?from=http%3A%2F%2Fresearch.microsoft.com%2Fen-us%2Fum%2Fpeople%2Fakapoor%2Fpapers%2Faaai2014.pdf>.

(Continued)

*Primary Examiner* — Ashish Thomas
*Assistant Examiner* — Jedidiah P Ferrer
(74) *Attorney, Agent, or Firm* — L. Jeffrey Kelly

(57) ABSTRACT

Disclosed aspects relate to analytics engine selection management. A set of reference data may be ingested by a first analytics engine to compile a first set of characteristic data. The set of reference data may be ingested by a second analytics engine to compile a second set of characteristic data. The first set of characteristic data may be compiled for the first analytics engine. The second set of characteristic data may be compiled for the second analytics engine. A set of distinct attributes related to the first and second analytics engines may be determined based on the first and second sets of characteristic data. An analytics engine selection operation may be executed.

17 Claims, 10 Drawing Sheets

(56) References Cited

U.S. PATENT DOCUMENTS

| | | | |
|---|---|---|---|
| 2006/0140499 | A1 | 6/2006 | Kang et al. |
| 2011/0307412 | A1 | 12/2011 | Rolia et al. |
| 2013/0238391 | A1 | 9/2013 | Klumpp et al. |
| 2014/0026136 | A1* | 1/2014 | Shiraishi ................ G06Q 10/06 718/100 |
| 2014/0114976 | A1* | 4/2014 | Shiraishi ............... G06F 16/583 707/737 |
| 2014/0244836 | A1 | 8/2014 | Goel et al. |
| 2015/0154246 | A1* | 6/2015 | Allen ................. G06F 16/2457 707/758 |
| 2015/0310015 | A1 | 10/2015 | Alexander et al. |
| 2015/0310362 | A1* | 10/2015 | Huffman ................ G06Q 50/22 705/2 |
| 2016/0148322 | A1 | 5/2016 | Mascaro et al. |
| 2017/0177330 | A1* | 6/2017 | Yu ............................. G06F 8/71 |
| 2017/0220633 | A1* | 8/2017 | Porath .................. G06F 16/248 |

OTHER PUBLICATIONS

Alba et al., "Analytics Engine Selection Management", U.S. Appl. No. 15/858,195, filed Dec. 29, 2017, pp. 1-45.

IBM Appendix P., "List of IBM Patents or Patent Applications to be Treated as Related", Dated Dec. 29, 2017, 2 pages.

* cited by examiner

700

Search Results for "Positive Sentiment"

Select 2 Analytics for Comparison

☐ Analytic #1
☐ Analytic #2
☐ Analytic #3
☐ Analytic #4
☐ Analytic #5
☐ Analytic #6
☐ Analytic #7
☐ Analytic #8
☐ Analytic #9
☐ Analytic #10

Search Results for "Positive Sentiment"

Select at least 2 Analytics for comparison

- [x] Analytic #1 ← 810
- [ ] Analytic #2
- [ ] Analytic #3
- [ ] Analytic #4
- [x] Analytic #5 ← 820
- [ ] Analytic #6
- [ ] Analytic #7
- [ ] Analytic #8
- [ ] Analytic #9
- [ ] Analytic #10

Analytics Comparison

Add data set(s) for comparison: ← 910
- Data Set 1
- Data Set 2
- Data Set 3

Select reference hardware:    VM Size XL ▼ ← 920

930

Analytic #1          Analytic #5

Memory Usage:

CPU Usage:

Run time:

Precison:

FIG. 9

ANALYTICS ENGINE SELECTION MANAGEMENT

BACKGROUND

This disclosure relates generally to computer systems and, more particularly, relates to analytics engine selection management. The amount of data that needs to be managed is increasing. Management of data may be desired to be performed as efficiently as possible. As data needing to be managed increases, the need for analytics engine selection management may also increase.

SUMMARY

Aspects of the disclosure relate to analytics engine selection management. Elements relate to selecting a particular analytics engine based on a comparative analysis with one or more other analytics engines with respect to a data set. A set of candidate analytics engines may be selected for testing. The set of candidate analytics engines may be run with respect to the same data set. Based on the analysis of the data set, a set of performance results for each analytics engine may be used to generate a comparative analysis of the set of candidate analytic engines. For instance, the comparative analysis may indicate the memory usage, processor usage, processor time, disk input-output, precision, or recall statistics for at least one analytics engine with respect to the data set. Based on the comparative analysis of the set of candidate analytics engines, one or more analytics engines of the set of candidate analytics engines may be selected for utilization.

Disclosed aspects relate to analytics engine selection management. A set of reference data may be ingested by a first analytics engine to compile a first set of characteristic data. The set of reference data may be ingested by a second analytics engine to compile a second set of characteristic data. The first set of characteristic data may be compiled for the first analytics engine. The second set of characteristic data may be compiled for the second analytics engine. A set of distinct attributes related to the first and second analytics engines may be determined based on the first and second sets of characteristic data. An analytics engine selection operation may be executed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example visual interface for selection of a set of analytics engines for comparison, according to embodiments.

FIG. 8 depicts another example visual interface for selection of a set of analytics engines for comparison, according to embodiments.

FIG. 9 depicts an example visual interface for selection of a set of parameters for use to compare a set of analytics engines, according to embodiments.

Figure 1:
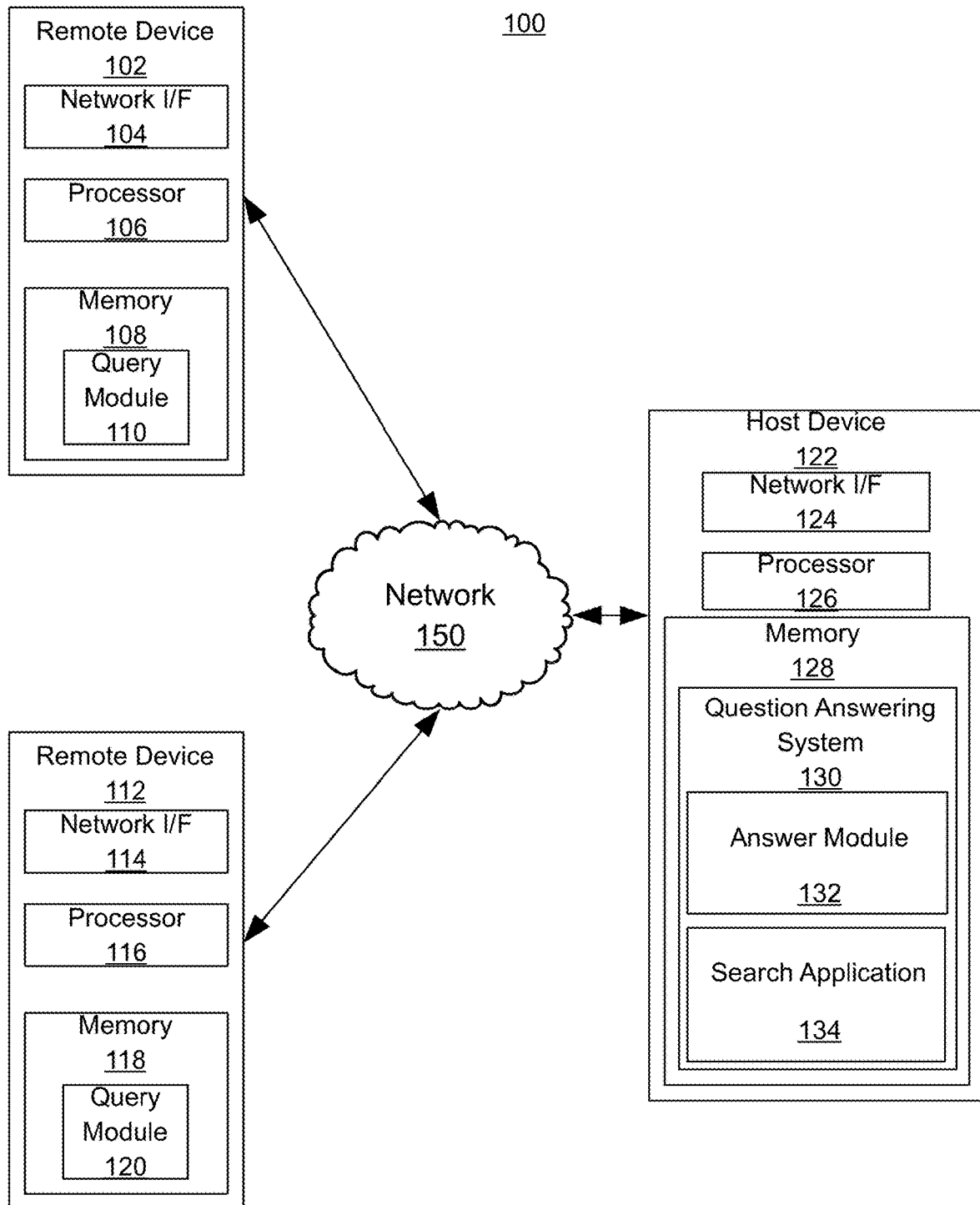
FIG. 1 is a diagrammatic illustration of an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to analytics engine selection management. Elements relate to selecting a particular analytics engine based on a comparative analysis with one or more other analytics engines with respect to a data set. A set of candidate analytics engines may be selected for testing. The set of candidate analytics engines may be run with respect to the same data set. Based on the analysis of the data set, a set of performance results for each analytics engine may be used to generate a comparative analysis of the set of candidate analytic engines. For instance, the comparative analysis may indicate the memory usage, processor usage, processor time, disk input-output, precision, or recall statistics for at least one analytics engine with respect to the data set. Based on the comparative analysis of the set of candidate analytics engines, one or more analytics engines of the set of candidate analytics engines may be selected for utilization (e.g., for use or implementation with respect to a target data set). Leveraging a comparative analysis of analytics engines may be associated with benefits such as analytic performance, accuracy, and compatibility.

Analytics engines are one tool available to facilitate the processing, examination, and evaluation of data. The performance of analytics engines may vary based on a variety of factors such as data quantity, data quality, topic domain, signal to noise ratio, and the like. Aspects of the disclosure relate to the recognition that selecting an analytics engine for a particular task or purpose may be associated with challenges, as it may be unclear how various analytics engines may perform with respect to a target data set (e.g., selecting an analytic without taking the properties and resource constraints of the target data set into account may lead to wasted resources or invalid results). Accordingly, aspects of the disclosure relate to a comparative analysis of analytics engines that takes into account the properties and attributes of target data sets. As such, selection of an analytics engine that is appropriate for a particular task or purpose may be facilitated.

Aspects of the disclosure relate to a system, method, and computer program product for analytics engine selection management. A set of reference data may be ingested by a first analytics engine to compile a first set of characteristic data. The set of reference data may be ingested by a second analytics engine to compile a second set of characteristic data. The first set of characteristic data may be compiled for the first analytics engine. The second set of characteristic data may be compiled for the second analytics engine. A set of distinct attributes related to the first and second analytics engines may be determined based on the first and second sets of characteristic data. An analytics engine selection operation may be executed.

In embodiments, the set of distinct attributes related to the first and second analytics engines may be provided to a user to execute the analytics engine selection operation. In embodiments, a set of candidate analytics engines related to the first and second analytics engines may be provided to a user to execute the analytics engine selection operation. In embodiments, an appropriate analytics may be selected to execute the analytics engine selection operation using an analytics engine selection criterion engine which corresponds to the set of distinct attributes related to the first and second analytics engines, and a set of content data may be processed using the appropriate analytics engine to generate a valid results-set. In embodiments, a set of computing cost data, resource usage data, precision-indicative data, recall-indicative data, typological data, or error-event data may be resolved for the first and second analytics engines to determine the set of distinct attributes related to the first and second analytics engines, and used to execute the analytics engine selection operation. Altogether, aspects of the disclosure can have performance or efficiency benefits. Aspects may save resources such as bandwidth, disk, processing, or memory.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 110, 120 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., receiving an input question, evaluating the quality of the input question, assigning a set of quality values, and generating an icon), and may be implemented by any combination of any quantity of software and/or hardware modules or units.

Figure 2:
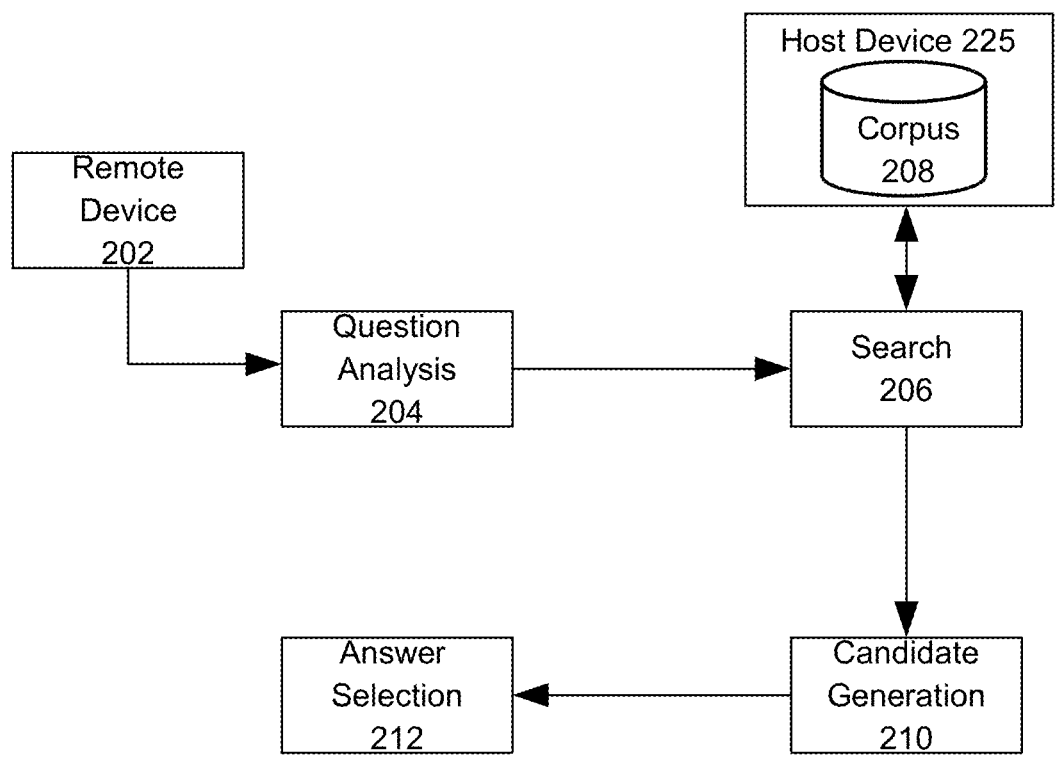
FIG. 2 is a system diagram depicting a high level logical architecture for a question answering system, according to embodiments.

FIG. 2 is a system diagram depicting a high-level logical architecture 200 for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212 which may produce a final ranked list of answers with associated confidence measure values.

The various components of the exemplary high level logical architecture for a QA system described above may be used to implement various aspects of the present disclosure. For example, the question analysis component 204 could, in certain embodiments, be used to process a natural language question for which relevant images can be provided. Further, the search component 206 can, in certain embodiments, be used to perform a search of a corpus of information 208 for a set of images that are related to an answer to an input question to the QA system. The candidate generation component 210 can be used to identify a set of candidate images based on the results of the search component 206. Further, the answer selection component 212 can, in certain embodiments, be used to determine and select a subset of the set of candidate images to provide in a display area. In certain embodiments, the determination of the subset of the candidate images can be based on a confidence value of the set of images and a designated display specification.

Figure 3:
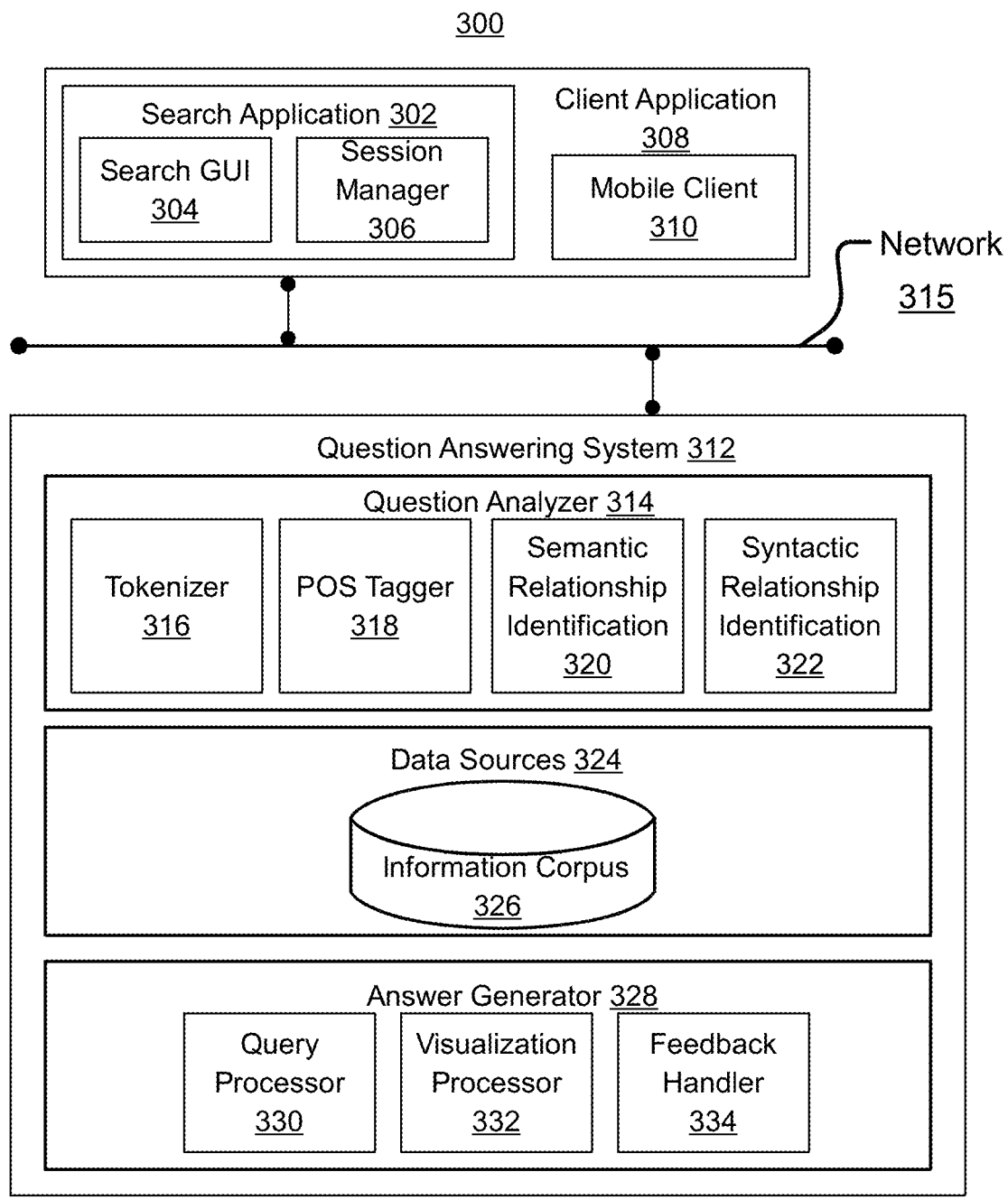
FIG. 3 is a block diagram illustrating a question answering system to generate answers to one or more input questions, according to embodiments.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS (part of speech) tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database (e.g., conform to an ontology). In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive an input question having a set of query attributes. The question analyzer 314 could, in certain embodiments, be used to evaluate the quality of the input question by comparing the set of query attributes to a set of assessment criteria. Further, the question answering system 312 could, in certain embodiments, be used to perform a search of an information corpus 326 for data that may provide an answer to the input question. The answer generator 328 can be used assign a set of quality values to the set of query attributes, as well as use the assigned set of quality values and the set of query attributes to generate an icon that indicates a visual representation of the quality of the input question. Further, the visualization processor 332 can, in certain embodiments, be used to render the icon (e.g., a digital face icon) in a designated display area.

Figure 4:
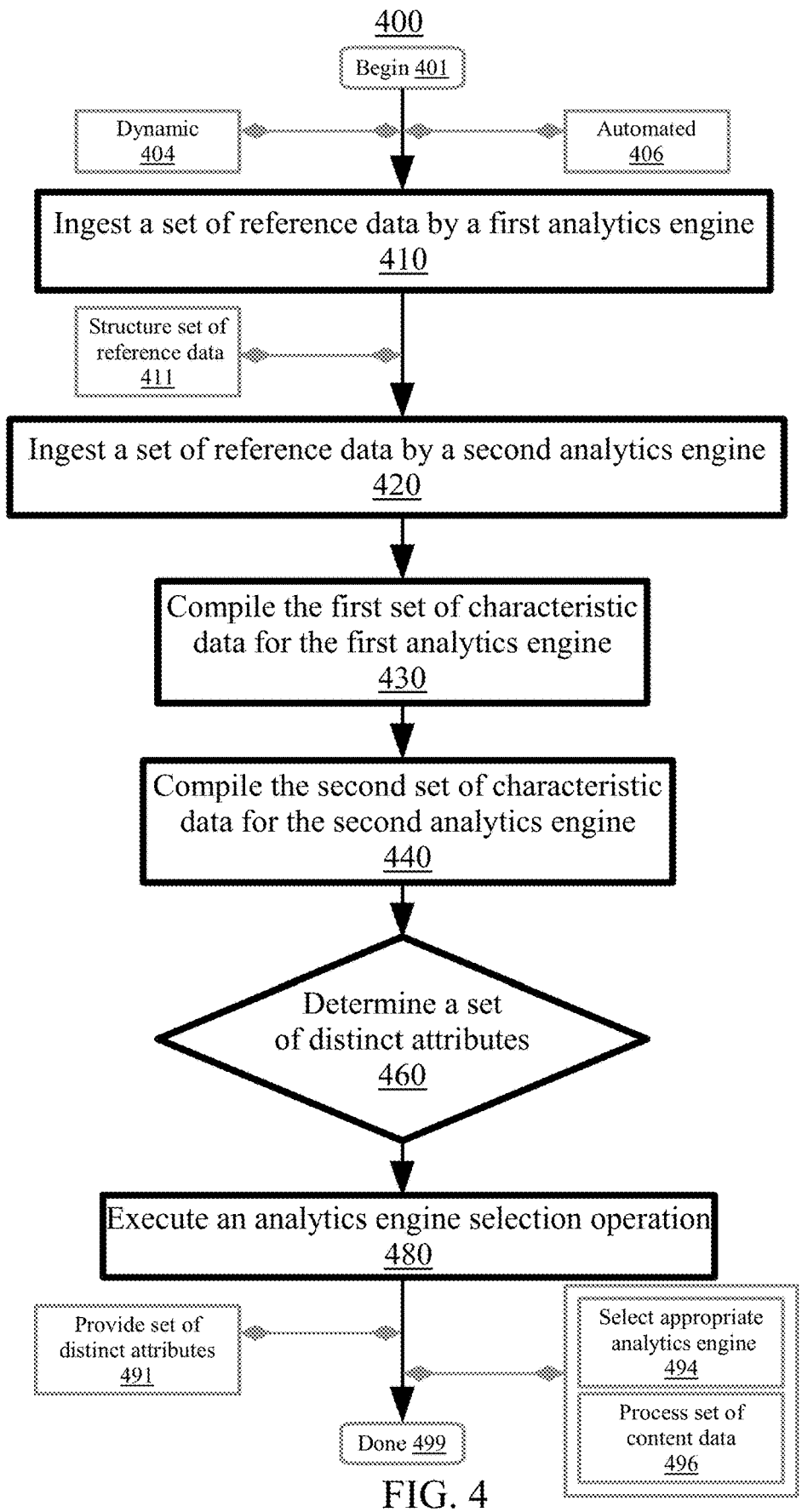
FIG. 4 is a flowchart illustrating a method for analytics engine selection management, according to embodiments.

FIG. 4 is a flowchart illustrating a method 400 for analytics engine selection management. Aspects of the method 400 relate to compiling a set of characteristic data for a first analytics engine and a second engine respectively, and executing an analytics engine selection operation based on a set of distinct attributes determined based on the set of characteristic data for the first analytics engine and the second engine. The performance of analytics engines may vary based on a variety of factors such as data quantity, data quality, topic domain, signal to noise ratio, and the like. Aspects of the disclosure relate to the recognition that selecting an analytics engine for a particular task or purpose may be associated with challenges, as it may be unclear how various analytics engines may perform with respect to a target data set (e.g., selecting an analytic without taking the properties and resource constraints of the target data set into account may lead to wasted resources or invalid results). Accordingly, aspects of the disclosure relate to a comparative analysis of analytics engines that takes into account the properties and attributes of target data sets. As such, selection of an analytics engine that is appropriate for a particular task or purpose may be facilitated. The method 400 may begin at block 401.

In embodiments, the ingesting, the ingesting, the compiling, the compiling, the determining, the executing, and the other steps described herein may each be executed in a dynamic fashion at block 404. The steps described herein may be executed in a dynamic fashion to streamline analytics engine selection management. For instance, the ingesting, the ingesting, the compiling, the compiling, the determining, the executing, and the other steps described herein may occur in real-time, ongoing, or on-the-fly. As an example, one or more steps described herein may be performed in an ongoing fashion (e.g., sets of characteristic data may be compiled in real-time as analytics engines continuously ingest sets of reference data) in order to streamline (e.g., facilitate, promote, enhance) analytics engine selection management. Other methods of performing the steps described herein are also possible.

In embodiments, the ingesting, the ingesting, the compiling, the compiling, the determining, the executing, and the other steps described herein may each be executed in an automated fashion at block 406. The steps described herein may be executed in an automated fashion without user intervention. In embodiments, the ingesting, the ingesting, the compiling, the compiling, the determining, the executing, and the other steps described herein may be carried out by an internal analytics engine selection management module maintained in a persistent storage device of a local computing device (e.g., network node). In embodiments, the ingesting, the ingesting, the compiling, the compiling, the determining, the executing, and the other steps described herein may be carried out by an external analytics engine selection management module hosted by a remote computing device or server (e.g., server accessible via a subscription, usage-based, or other service model). In this way, aspects of analytics engine management may be performed using automated computing machinery without manual action. Other methods of performing the steps described herein are also possible.

At block 410, a set of reference data may be ingested by a first analytics engine. The ingesting may be performed to compile a first set of characteristic data for the first analytics engine with respect to the set of reference data. Generally, ingesting can include receiving, processing, collecting, gathering, detecting, sensing, accepting delivery of, or otherwise importing the set of reference data by the first analytics engine. The set of reference data may include a collection of structured or unstructured information configured to serve as a test set for the first analytics engine. The set of reference data may be used to assess, examine, or evaluate the performance of the first analytics engine. As examples, the set of reference data may include input data (e.g., data to be processed), benchmark data (e.g., established performance norms), a representative sample (e.g., data from a target application), or a sample of a larger dataset that may be intended to be run with the first analytics engine. The first analytics engine may include a module, application, routine, algorithm, technique, or other collection of computer instructions configured to examine, discover, interpret, transform, or process data to derive meaning or perform tasks. As examples, the first analytics engine may include natural language processing techniques, image analysis techniques, predictive analytics, statistical analysis, prescriptive analytics, market modeling, web analytics, security analytics, risk analytics, software analytics, and the like. In embodiments, the first analytics engine may be configured to ingest the set of reference data to compile a first set of characteristic data. In embodiments, ingesting the set of reference data may include automatically importing a pre-selected set of reference data for analysis. In embodiments, ingesting the set of reference data may include receiving a user-selected set of reference data for analysis. As an example, a first analytics engine of "Proper Noun Identifier" may import a set of reference data including an encyclopedia entry related to "Thermodynamics" for analysis. Other methods of ingesting the set of reference data to compile a first set of characteristic data for the first analytics engine with respect to the set of reference data are also possible.

In embodiments, the set of reference data may be structured at block 411. The set of reference data may be structured to include a domain. The set of reference data may be structured to include a set of substantive content information. The set of reference data may be structured to include a set of constraints. Generally, structuring can include building, forming, assembling, organizing, creating, configuring, formatting, or otherwise arranging the set of reference data to include the domain, the set of substantive content information, and the set of constraints. The domain may include a property of the set of reference data that indicates a category, division, group, classification, or type of the set of reference data. In embodiments, the domain may specify a topic, origin, subject matter, format, file size, theme, or category field of the set of reference data. As an example, the domain may indicate that the set of reference data is an excerpt from an instruction manual. In embodiments, the set of substantive content information may include a volume of structured or unstructured data that makes up the body of the set of reference data. For instance, the set of substantive content may include text data (e.g., from a book, article, discourse, medical journal, scientific study), image data (e.g., photographs, digital images, pictures), video data (e.g., video recording, presentation), audio data (e.g., recorded dialogue, music files) or the like. In embodiments, the set of constraints may include a collection of requirements, stipulations, limitations, conditions, or parameters that characterize how the set of reference data is to be processed, handled, or otherwise managed by an analytics engine. For instance, the set of constraints may indicate minimum/recommended system resources, security protocols/encryption standards, compatible software environments (e.g., operating systems, drivers), compatible hardware environments, or other factors that are recommended or required for management of the set of reference data. In embodiments, structuring may include formatting the domain, set of substantive content information, and set of constraints of the set of reference information according to a pre-existing/standardized encoding or organization protocol.

Aspects of the disclosure relate to the recognition that, in some embodiments, the set of reference data may be used to evaluate the performance capabilities of one or more analytics engines. Accordingly, in embodiments, the set of reference data may be structured to include a set of ground truth data. The set of ground truth data may include a collection of verified answers or results that represent a benchmark, rubric, or basis on which to evaluate the performance of the one or more analytics engines. For instance, the set of ground truth data may indicate all the correct answers for a test exercise performed by an analytics engine. As an example, for a set of reference data configured to evaluate the capability of an analytics engine to identify proper nouns within a text, the set of ground truth data may include an index of every proper noun that occurs within the text as well as the location where it is located. In this way, the performance of an analytics engine may be measured by comparing the results of the analytics engine against the set of ground truth data. Other methods of structuring the set of reference data are also possible.

At block 420, the set of reference data may be ingested by a second analytics engine. The ingesting may occur to compile a second set of characteristic data for the second analytics engine with respect to the set of reference data. Generally, ingesting can include receiving, processing, collecting, gathering, detecting, sensing, accepting delivery of, or otherwise importing the set of reference data by the second analytics engine. As described herein, the set of reference data may include a collection of structured or unstructured information configured to serve as a test set for the second analytics engine (e.g., input data, benchmark data, representative sample, sample of a larger data set). In embodiments, the set of reference data ingested by the second analytics engine may be the same as (e.g., identical, similar, achieve a similarity threshold with respect to) the set of reference data ingested by the first analytics engine. As such, the set of reference data may be processed by both the first and second analytics engines independently to comparatively evaluate the first analytics engine and the second analytics engine with respect to each other. As described herein, the second analytics engine may include a module, application, routine, algorithm, technique, or other collection of computer instructions configured to examine, discover, interpret, transform, or process data to derive meaning or perform tasks (e.g., natural language processing, image analysis, predictive analytics, statistical analysis, prescriptive analytics, market modeling, web analytics, security analytics, risk analytics, software analytics). In embodiments, the second analytics engine may be configured to ingest the set of reference data to compile a second set of characteristic data. In embodiments, ingesting the set of reference data may include loading the set of reference data into a queue to be processed by the second analytics engine. In embodiments, ingesting the set of reference data may include receiving delivery of the same set of reference data that was ingested by the first analytics engine (e.g., the set of reference data may be assigned to both the first and second analytics engines simultaneously). As an example, a second analytics engine of "Part-of-Speech Tagger" may import an encyclopedia entry related to "Thermodynamics" (e.g., the same encyclopedia entry imported by the first analytics engine) for analysis. Other methods of ingesting the set of reference data to compile a second set of characteristic data for the second analytics engine with respect to the set of reference data are also possible.

At block 430, the first set of characteristic data for the first analytics engine may be compiled. The compiling may occur with respect to the set of reference data. Generally, compiling can include creating, forming, generating, assembling, formulating, collecting, aggregating, or otherwise ascertaining the first set of characteristic data for the first analytics engine. The first set of characteristic data may include a collection of properties, traits, attributes, factors, or other aspects that characterize the behavior or performance of the first analytics engine with respect to the set of reference data. For instance, the first set of characteristic data may include a variety of metrics that provide a quantitative indication of the performance, efficiency, compatibility, or suitability of the first analytics engine with respect to the set of reference data. As examples, the first set of characteristic data may include metrics such as computing cost data (e.g., operational cost), resource usage data (e.g., amount/percentage of system resources), precision (e.g., fraction of results that are valid), recall (e.g., fraction of valid results that are identified), typology data (e.g., which types of data the first analytics engine was effective on versus types of data it was ineffective on), error-event data (e.g., failures/bugs encountered), or other factors to evaluate the performance of the first analytics engine with respect to the set of reference data. In embodiments, compiling the first set of characteristic data may include utilizing the first analytics engine to perform one or more diagnostic tests on the set of reference data, and monitoring the operation of the first analytics engine to collect statistics regarding the performance of the first analytics engine with respect to the set of reference data. The collected statistics may be aggregated as the first set of characteristic data. As an example, a first analytics engine including a product classification technique may be configured to sort a group of 100 products (e.g., indicated by the set of reference data) into a number of different categories. The diagnostic test may be run, and it may be ascertained that of the 100 products, 86 were sorted correctly, and 14 were sorted incorrectly. Accordingly, a first set of characteristic data may be collected that indicates that the first analytics engine used 2.4 gigahertz of processing resources, 2984 megabytes of memory, completed the task in 9 seconds, and had an accuracy of 86%. Other methods of compiling the first set of characteristic data for the first analytics engine are also possible.

At block 440, the second set of characteristic data for the second analytics engine may be compiled. The compiling may occur with respect to the set of reference data. Generally, compiling can include creating, forming, generating, assembling, formulating, collecting, aggregating, or otherwise ascertaining the second set of characteristic data for the second analytics engine. As described herein, the second set of characteristic data may include a collection of properties, traits, attributes, factors, or other aspects that characterize the behavior or performance of the second analytics engine with respect to the set of reference data. For instance, the second set of characteristic data may include a variety of metrics that provide a quantitative indication of the performance, efficiency, compatibility, or suitability of the second analytics engine with respect to the set of reference data. As examples, the second set of characteristic data may include metrics such as computing cost data (e.g., operational cost), resource usage data (e.g., amount/percentage of system resources), precision (e.g., fraction of results that are valid), recall (e.g., fraction of valid results that are identified), typology data (e.g., which types of data the second analytics engine was effective on versus types of data it was ineffective on), error-event data (e.g., failures/bugs encountered), or other factors to evaluate the performance of the second analytics engine with respect to the set of reference data. In embodiments, compiling the second set of characteristic data may include utilizing the second analytics engine to perform one or more diagnostic tests on the set of reference data, and monitoring the operation of the second analytics engine to collect statistics regarding the performance of the second analytics engine with respect to the set of reference data. The collected statistics may be aggregated as the second set of characteristic data. As an example, a second analytics engine of a product classification technique may be configured to sort a group of 100 products (e.g., indicated by the set of reference data) into a number of different categories. The diagnostic test may be run, and it may be ascertained that of the 100 products, 98 were sorted correctly, and 2 were sorted incorrectly. Accordingly, a first set of characteristic data may be collected that indicates that the second analytics engine used 2.9 gigahertz of processing resources, 3412 megabytes of memory, completed the task in 14 seconds, and had an accuracy of 98%. Other methods of compiling the second set of characteristic data for the second analytics engine are also possible.

At block 460, a set of distinct attributes may be determined. The determining may occur based on the first and second sets of characteristic data. The set of distinct attributes may relate to the first and second analytics engines. Generally, determining can include computing, formulating, detecting, calculating, identifying, or otherwise ascertaining the set of distinct attributes. The set of distinct attributes may include characteristics or properties that distinguish the first analytics engine from the second analytics engine (e.g., or other analytics engines involved in the comparison). In embodiments, the set of distinct attributes may be a subset of characteristics selected or derived from the first and second sets of characteristic data (e.g., highlighted indication of which characteristics of each analytics engines achieved better performance relative to other analytics engines). In embodiments, the set of distinct attributes may include a scoring or ranking of the first and second sets of characteristic data. For instance, the set of distinct attributes may include a comparative index of both the first and second sets of characteristic data, such that each characteristic is assigned a score (e.g., integer between 0 and 100) indicating an evaluation of the performance of the first or second analytics engine with respect to that characteristic. As an example, a first analytics engine that completed a diagnostic test in 18 seconds may be assigned a score of "89" for a characteristic of "Completion Time," while a second analytics engine that completed the diagnostic test in 31 seconds may be assigned a score of "40" for the characteristic of "Completion Time." In embodiments, determining the set of distinct attributes may include evaluating the first set of characteristic data and the second set of characteristic data (e.g., with respect to one another, with respect to a benchmark, with respect to a set of ground truth data) and identifying those characteristics that achieved a performance level (e.g., raw performance level, relative performance level with respect to other analytics engines, score) above a threshold. The characteristics that are identified as achieving the performance level above the threshold for each analytics engine may be ascertained as the set of distinct attributes for that analytics engine, respectively. As an example, consider a first analytics engine associated with a first set of characteristic data indicating a completion time of 72 seconds, a precision of 96%, and a CPU utilization level of 83%, and a second analytics engine associated with a second set of characteristic data indicating a completion time of 46 seconds, a precision of 79%, and a CPU utilization level of 55%. Accordingly, determining the set of distinct attributes may include comparing the first set of characteristic data and the second set of characteristic data, and ascertaining a set of distinct attributes of "Precision" for the first analytics engine and a set of distinct attributes of "Completion Time; CPU Efficiency" for the second analytics engine (e.g., the relative areas in which each analytics engine performed best). Other methods of determining the set of distinct attributes are also possible.

At block 480, an analytics engine selection operation may be executed. The executing may be performed using the set of distinct attributes related to the first and second analytics engines. Generally, executing can include carrying-out, accomplishing, implementing, completing, initiating, enacting, instantiating, or otherwise performing the analytics engine selection operation. The analytics selection operation may include a process, procedure, or other action to select (e.g., choose, pick, identify) an analytics engine for utilization (e.g., to process a data set, perform a task/function). In embodiments, executing the analytics engine selection operation may include configuring a computer hardware component or software module (e.g., analytics engine selection management module) to identify one or more analytics engines based on the set of distinct attributes. For instance, an analytics engine selection management module may be configured to compare the set of distinct attributes of the first analytics engine and the second analytics engine with respect to a set of performance thresholds that defines benchmark performance levels for the different types of analytics engines (e.g., CPU utilization under 50%, Completion Time under 60 seconds). Accordingly, based on the comparison, one or more of the analytics engines may be selected for utilization (e.g., analytics engines that achieve the set of performance thresholds). Other methods of executing the analytics engine selection operation are also possible.

In embodiments, the set of distinct attributes may be provided at block 491. The set of distinct attributes may be provided (e.g., to a user, without a user) to execute the analytics engine selection operation. The set of distinct attributes may relate to the first and second analytics engines. Generally, providing can include displaying, showing, relaying, conveying, communicating, transmitting, indicating, or presenting the set of distinct attributes to the user to execute the analytics engine selection. Aspects of the disclosure relate to the recognition that, in some situations, the analytics engine selection may be executed by a user (e.g., based on the judgment of the user). Accordingly, the set of distinct attributes may be provided to the user to facilitate user selection of an analytics engine. In embodiments, providing the set of distinct attributes may include generating a set of statistics based on the set of distinct attributes to present a visual representation to compare and contrast the performance of the first and second analytics engines. For instance, the set of statistics may include graphs, tables, measurements, timelines, results, relationships, and other data to illustrate the performance (e.g., absolute or relative to other analytics engines) of the first and second analytics engines. In embodiments, providing the set of distinct attributes may include generating an operational simulation of the performance of each analytics engine to illustrate how the first and second analytics engines operated on the set of reference data. In embodiments, as described herein, in response to providing the set of distinct attributes, the user may select one or more analytics engines for utilization. Other methods of providing the set of distinct attributes to a user to execute the analytics engine selection operation are also possible.

In embodiments, an appropriate analytics engine may be selected at block 494. The selecting may occur to execute the analytics engine selection operation. The selecting may use an analytics engine selection criterion which corresponds to the set of distinct attributes related to the first and second analytics engines. Generally, selecting can include choosing, picking, ascertaining, nominating, determining, electing, or otherwise identifying the appropriate analytics engine to execute the analytics engine selection operation. The appropriate analytics engine may include an analytics engine associated with performance, efficiency, quality, reliability, or compatibility with respect to a particular task, function, or operation as indicated by the set of distinct attributes. In embodiments, the appropriate analytics engine may be selected from among the first or second analytics engines (e.g., or other compared analytics engines). In certain embodiments, the appropriate analytics engine may include an analytics engine that is related to either the first or second analytics engines (e.g., same family of analytics, newer/updated version of one of the evaluated analytics engines). In embodiments, selecting the appropriate analytics engine may be performed in an automated fashion (e.g., using a computer hardware component or software module) based on an analytics engine selection criterion. The analytics engine selection criterion may include a collection of parameters that define the benchmark requirements, conditions, and parameters that an analytics engine must achieve to be selected for utilization with respect to a particular task, function, or operation. For instance, selecting the appropriate analytics engine may include using an analytics engine selection management module to compare the set of distinct attributes with the analytics engine selection criterion, and identify an analytics engine that achieves the analytics engine selection criterion. As an example, a particular use application may be associated with an analytics engine selection criterion of "Precision Rate of no less than 95%." Accordingly, a first analytics engine having a precision rate of 96% as well as a second analytics engine having a precision rate of 94% may be compared to the analytics engine selection criterion, and the first analytics engine may be selected as the appropriate analytics engine (e.g., as the precision rate of 96% achieves the precision rate defined by the analytics engine selection criterion of "no less than 95%). Other methods of selecting the appropriate analytics engine to execute the analytics engine selection operation are also possible.

In embodiments, a set of content data may be processed at block 496. The set of content data may generate a valid results-set. The processing may occur using the appropriate analytics engine. Generally, processing can include analyzing, evaluating, investigating, transforming, assessing, converting, or otherwise performing an operation on the set of content data using the appropriate analytics engine. The set of content data may include a collection of data that is marked, scheduled, or queued for processing by the appropriate analytics engine (e.g., a target data set for which the appropriate analytics engine is selected). In embodiments, the set of content data may be related, linked, or associated with the set of reference data. For instance, the set of content data may include a larger data set from which the set of reference data was extracted, a data set that shares one or more characteristics with the set of reference data (e.g., same domain, same set of constraints, same set of substantive content information), or a subset of the set of reference data. In embodiments, processing the set of content data may include running the appropriate analytics engine on the set of content data to generate a valid results-set. The valid results-set may include an output or outcome of a processing operation that ascertained to be accurate, genuine, meaningful, or useful (e.g., with respect to a task, function, or operation). Consider the following example. An appropriate analytics engine of a mathematical curve-fitter may be configured to perform a curve-fitting operation on a set of content data including a set of observed data points. Accordingly, the appropriate analytics engine may generate a valid results-set including a curve-fitted graph and the mathematical function that was used to fit the set of content data. Other methods of processing the set of content data using the appropriate analytics engine are also possible.

Consider the following example. A set of reference data may include a corpus of text from a medical research journal. In embodiments, it may be desirable to determine an analytics engine that can parse the corpus of text and identify each instance of a disease name. Accordingly, as described herein, a first analytics engine and a second analytics engine may be selected for comparison, and the first and second analytics engines may import the corpus of text from the medical research journal. In embodiments, both the first and second analytics engines may be run on the corpus of text, and an analytics engine selection management module may be configured to monitor performance diagnostics for each analytic engine. Based on the performance diagnostics, a first set of characteristic data may be compiled for the first analytics engine and a second set of characteristic data may be compiled for the second analytics engine. As an example, the first set of characteristic data may indicate that the first analytics engine processed the corpus of text with 1746 megabytes of memory, 71% CPU usage, 44320 read/write operations, 61% precision, and 88% recall. The second set of characteristic data may indicate that the second analytics engine processed the corpus of text with 1913 megabytes of memory, 79% CPU usage, 58938 read/write operations, 92% precision and 96% recall. Accordingly, based on the first and second sets of characteristic data, a set of distinct attributes may be determined for the first and second analytics engines. For example, the set of distinct attributes for the first analytics engine may include "8.73% more memory efficient," 8% more CPU efficient," "24% more Disk IO efficient," and the set of distinct attributes for the second analytics engine may include "31% greater precision" and "8% greater recall." As described herein, an analytics engine selection operation may be executed using the set of distinct attributes related to the first and second analytics engines. For instance, in embodiments, executing the analytics engine selection operation may include comparing the set of distinct attributes to an analytics engine selection criterion of "Precision no less than 85%, Recall no less than 90%." Accordingly, the second analytics engine may be selected for utilization (e.g., the precision and recall statistics for the second analytics engine achieve the requirements specified by the analytics engine selection criterion). Other methods of analytics engine selection management are also possible.

Method 400 concludes at block 499. As described herein, aspects of method 400 relate to analytics engine selection management. Aspects of method 400 may provide performance or efficiency benefits related to analytics engine selection management. As an example, using a set of reference data to facilitate a comparison of a plurality of analytics engines may streamline analytics engine selection (e.g., analytics engines that are suitable for particular tasks or operations may be determined, and analytics engine performance may be promoted). Leveraging a comparative analysis of analytics engines may be associated with benefits such as analytic performance, accuracy, and compatibility. Aspects may save resources such as bandwidth, processing, or memory.

Figure 5:
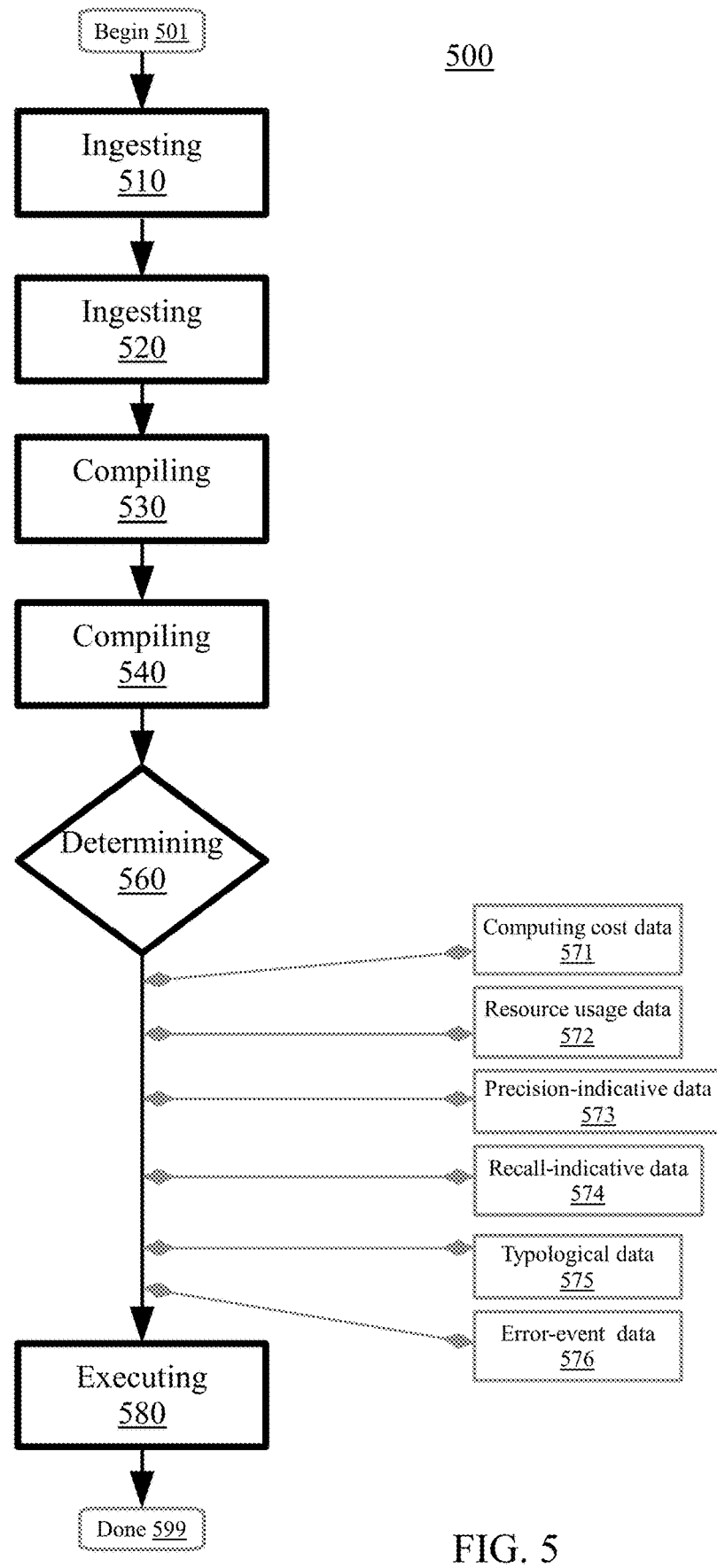
FIG. 5 is a flowchart illustrating another method for analytics engine selection management, according to embodiments.

FIG. 5 is a flowchart illustrating another method 500 for analytics engine selection management. Aspects may be similar or the same as aspects of method 400, and aspects may be used interchangeably. The method 500 may begin at block 501. At block 510, a set of reference data may be ingested. The ingesting may be performed by a first analytics engine. The ingesting may occur to compile a first set of characteristic data for the first analytics engine with respect to the set of reference data. At block 520, the set of reference data may be ingested. The ingesting may be performed by a second analytics engine. The ingesting may occur to compile a second set of characteristic data for the second analytics engine with respect to the set of reference data. At block 530, the first set of characteristic data for the first analytics engine may be compiled. The compiling may occur with respect to the set of reference data. At block 540, the second set of characteristic data for the second analytics engine may be compiled. The compiling may occur with respect to the set of reference data. At block 560, a set of distinct attributes may be determined. The determining may occur based on the first and second sets of characteristic data. The set of distinct attributes may relate to the first and second analytics engines.

In embodiments, a set of computing cost data for the first and second analytics engines may be resolved at block 571. The resolving may occur to determine the set of distinct attributes related to the first and second analytics engines. Generally, resolving can include computing, formulating, detecting, calculating, identifying, or otherwise ascertaining the set of computing cost data for the first and second analytics engines. The set of computing cost data may include an estimate or calculation of the expenses, price, cost, or other expenditure associated with the first and second analytics engines, respectively. For instance, the set of computing cost data may include the operational cost (e.g., cost to use/maintain), licensing cost (e.g., cost to acquire permission to use), terms/conditions (e.g., stipulations associated with use), restrictions (e.g., limitations pertaining to use), purchase price (e.g., cost to buy), or other type of expense related to either the first or second analytics engine. As an example, resolving the set of computing cost data may include generating a usage simulation that models the operational cost of the first and second analytics engines with respect to each other, and ascertaining that the second analytics engine is 18% more cost effective on a yearly basis. As another example, resolving the set of computing cost data may include identifying that the first analytics engine is free to use for research use, but the terms and conditions stipulate that commercial use requires a subscription membership of $499 a year. In embodiments, the analytics engine selection operation may be executed. The executing may occur using the set of computing cost data for the first and second analytics engines. Generally, executing can include carrying-out, accomplishing, implementing, completing, initiating, enacting, instantiating, or otherwise performing the analytics engine selection operation using the set of computing cost data for the first and second analytics engines. In embodiments, executing the analytics engine selection operation may include comparing the set of computing cost data to an analytics engine selection criterion (e.g., that specifies a computing cost threshold) to ascertain an appropriate analytics engine to suit the needs of a particular task, operation, or function. Other methods of resolving the set of computing cost data and executing the analytics engine selection operation using the set of computing cost data are also possible.

In embodiments, a set of resource usage data for the first and second analytics engines may be resolved at block 572. The resolving may occur to determine the set of distinct attributes related to the first and second analytics engines. Generally, resolving can include computing, formulating, detecting, calculating, identifying, or otherwise ascertaining the set of resource usage data for the first and second analytics engines. The set of resource usage data may include an estimation or calculation of the amount of computing resources associated with use of the first and second analytics engines, respectively. For instance, the set of resource usage data may indicate the memory usage (e.g., random-access memory usage of 3214 megabytes, disk storage space of 200 megabytes), processor usage (e.g., CPU utilization of 54%), disk input/output usage (e.g., 30,000 read operations, 25,000 write operations), bandwidth usage (e.g., 300 megabits per second), time (e.g., completion time of 42 seconds), or the like. In embodiments, resolving the set of resource usage data may include utilizing a resource usage monitor to perform a series of diagnostic tests to ascertain the resource utilization of both the first and second analytics engines. As an example, the resource usage monitor may calculate that the first analytics engine used 4412 megabytes of memory, 61% CPU utilization, performed 60,347 read operations and 58,033 write operations, used 456 megabits of bandwidth per second, and completed the operation in 89 seconds. In embodiments, the analytics engine selection operation may be executed. The executing may occur using the set of resource usage data for the first and second analytics engines. Generally, executing can include carrying-out, accomplishing, implementing, completing, initiating, enacting, instantiating, or otherwise performing the analytics engine selection operation using the set of resource data for the first and second analytics engines. In embodiments, executing the analytics engine selection operation may include comparing the set of resource usage data to an analytics engine selection criterion (e.g., that specifies a resource usage threshold) to ascertain an appropriate analytics engine to suit the needs of a particular task, operation, or function. Other methods of resolving the set of resource usage data and executing the analytics engine selection operation using the set of resource usage data are also possible.

In embodiments, a set of precision-indicative data for the first and second analytics engines may be resolved at block 573. The resolving may occur to determine the set of distinct attributes related to the first and second analytics engines. Generally, resolving can include computing, formulating, detecting, calculating, identifying, or otherwise ascertaining the set of precision-indicative data for the first and second analytics engines. The set of precision-indicative data may include an indication of what fraction of a group of results are valid (e.g., correct, meaningful, useful). In embodiments, the set of precision-indicative data may indicate a frequency of false-positives for a particular data set. As an example, consider a database including 100 data entries that indicate the residents of a town, however 17 of the 100 residents have moved to another town. Accordingly, the set of precision-indicative data may indicate that of the 100 data entries, 83% are valid (e.g., residents that no longer live in the town may not be considered valid entries). In embodiments, resolving the set of precision-indicative data may include analyzing a data set with respect to a validity criterion that defines which results are considered to be valid and which results are considered to be invalid, and subsequently calculating the set of precision-indicative data for the data set. In embodiments, the analytics engine selection operation may be executed. The executing may occur using the set of precision-indicative data for the first and second analytics engines. Generally, executing can include carrying-out, accomplishing, implementing, completing, initiating, enacting, instantiating, or otherwise performing the analytics engine selection operation using the set of precision-indicative data for the first and second analytics engines. In embodiments, executing the analytics engine selection operation may include comparing the set of precision-indicative data to an analytics engine selection criterion (e.g., that specifies a precision threshold) to ascertain an appropriate analytics engine to suit the needs of a particular task, operation, or function. Other methods of resolving the set of precision-indicative data and executing the analytics engine selection operation using the set of precision-indicative data are also possible.

In embodiments, a set of recall-indicative data for the first and second analytics engines may be resolved at block 574. The resolving may occur to determine the set of distinct attributes related to the first and second analytics engines. Generally, resolving can include computing, formulating, detecting, calculating, identifying, or otherwise ascertaining the recall-indicative data for the first and second analytics engines. The set of recall-indicative data may include an indication of what fraction of a group of valid results are accurately identified (e.g., by an analytics engine). In embodiments, the set of recall-indicative data may indicate a frequency of false-negatives for a particular data set. As an example, consider a data set that includes a set of reviews for a product (e.g., toaster). The set of reviews may be analyzed by an analytics engine configured to identify all instances of positive sentiment (e.g., happiness, enthusiasm, gratitude) with respect to the product. In embodiments, the analytics engine may identify 17 of a total of 20 instances of positive sentiment. Accordingly, the recall-indicative data may indicate a recall rate of "85%" for the analytics engine. In embodiments, resolving the set of recall-indicative data may include comparing the analysis results of a particular analytics engine for a set of reference data with respect to a set of ground truth data for the same set of reference data to determine how well the analytics engine performed with respect to a benchmark. In embodiments, the analytics engine selection operation may be executed. The executing may occur using the set of recall-indicative data for the first and second analytics engines. Generally, executing can include carrying-out, accomplishing, implementing, completing, initiating, enacting, instantiating, or otherwise performing the analytics engine selection operation using the set of recall-indicative data for the first and second analytics engines. In embodiments, executing the analytics engine selection operation may include comparing the set of recall-indicative data to an analytics engine selection criterion (e.g., that specifies a recall threshold) to ascertain an appropriate analytics engine to suit the needs of a particular task, operation, or function. Other methods of resolving the set of recall-indicative data and executing the analytics engine selection operation using the set of recall-indicative data are also possible.

In embodiments, a set of typological data for the first and second analytics engines may be resolved at block 575. The resolving may occur to determine the set of distinct attributes related to the first and second analytics engines. Generally, resolving can include computing, formulating, detecting, calculating, identifying, or otherwise ascertaining the set of typological data for the first and second analytics engines. The set of typological data may include information regarding the measured performance of the first and second analytics engines with respect to different characteristics, attributes, properties, aspects, or types of data included in the set of reference data. For instance, the set of typological data may indicate which types of data in the reference data were analyzed satisfactorily (e.g., performance level above a threshold) as well as which types of data in the reference data that were not analyzed satisfactorily (e.g., performance level below a threshold) for each analytics engine. As an example, the set of typological data may indicate that an analytics engine of a natural language processing technique had a 96% recall rate with respect to results in a scientific journal, but only a 13% recall rate with respect to results in a satirical political column. As another example, the set of typological data may indicate that an analytics engine of an object recognition technique correctly identified 29 out of 30 objects in a digital image, but only 2 of 30 objects in a video. Other types of typological data (e.g., structured data, unstructured data, statistical data, commentary data) are also possible. In embodiments, resolving the set of typological data may include monitoring the performance of the first and second analytics engines with respect to data sets associated with particular typology tags (e.g., markers or identifiers that indicate a type, attribute, topic, or attribute of the data set), and aggregating the monitored data to ascertain the suitability of each analytics engine with respect to different data types. In embodiments, the analytics engine selection operation may be executed. The executing may occur using the set of typological data for the first and second analytics engines. Generally, executing can include carrying-out, accomplishing, implementing, completing, initiating, enacting, instantiating, or otherwise performing the analytics engine selection operation using the set of typological data for the first and second analytics engines. In embodiments, executing the analytics engine selection operation may include comparing the set of typological data to an analytics engine selection criterion (e.g., that specifies a typological threshold) to ascertain an appropriate analytics engine to suit the needs of a particular task, operation, or function. Other methods of resolving the set of typological data and executing the analytics engine selection operation using the set of typological data are also possible.

In embodiments, a set of error-event data for the first and second analytics engines may be resolved at block 576. The resolving may occur to determine the set of distinct attributes related to the first and second analytics engines. Generally, resolving can include computing, formulating, detecting, calculating, identifying, or otherwise ascertaining the set of error-event data for the first and second analytics engines. The set of error-event data may indicate information regarding the nature of any failures, malfunctions, bugs, glitches, or other irregularities that occurred with respect to a particular analytics engine's operation on a set of reference data. For instance, the set of error-event data may indicate the number of errors that occurred, the type of error, severity of the error, potential causes of the error, potential solutions for the error, or the like. In embodiments, resolving the set of error-event data may include examining an error history log with respect to each analytics engine, and identifying the set of error-event data of a particular analytics engine with respect to a particular set of reference data. As an example, in certain embodiments, resolving the set of error-event data may include running an analytics engine with respect to a set of reference data, and examining the error history log to identify that an error of "Format mismatch" occurred with respect to an image embedded in the set of reference data (e.g., the analytics engine may not be configured to process/analyze images of a particular format). In embodiments, the analytics engine selection operation may be executed. The executing may occur using the set of error-event data for the first and second analytics engines. Generally, executing can include carrying-out, accomplishing, implementing, completing, initiating, enacting, instantiating, or otherwise performing the analytics engine selection operation using the set of error-event data for the first and second analytics engines. In embodiments, executing the analytics engine selection operation may include comparing the set of error-event data to an analytics engine selection criterion (e.g., that specifies an error-event threshold) to ascertain an appropriate analytics engine to suit the needs of a particular task, operation, or function. Other methods of resolving the set of error-event data and executing the analytics engine selection operation using the set of error-event data are also possible.

At block 580, an analytics engine selection operation may be executed. The executing may occur using the set of distinct attributes related to the first and second analytics engines. Method 500 concludes at block 599. As described herein, aspects of method 500 relate to analytics engine selection management. Aspects of method 500 may provide performance or efficiency benefits related to analytics engine selection management. Altogether, leveraging a comparative analysis of analytics engines may be associated with benefits such as analytic performance, accuracy, and compatibility. Aspects may save resources such as bandwidth, processing, or memory.

Figure 6:
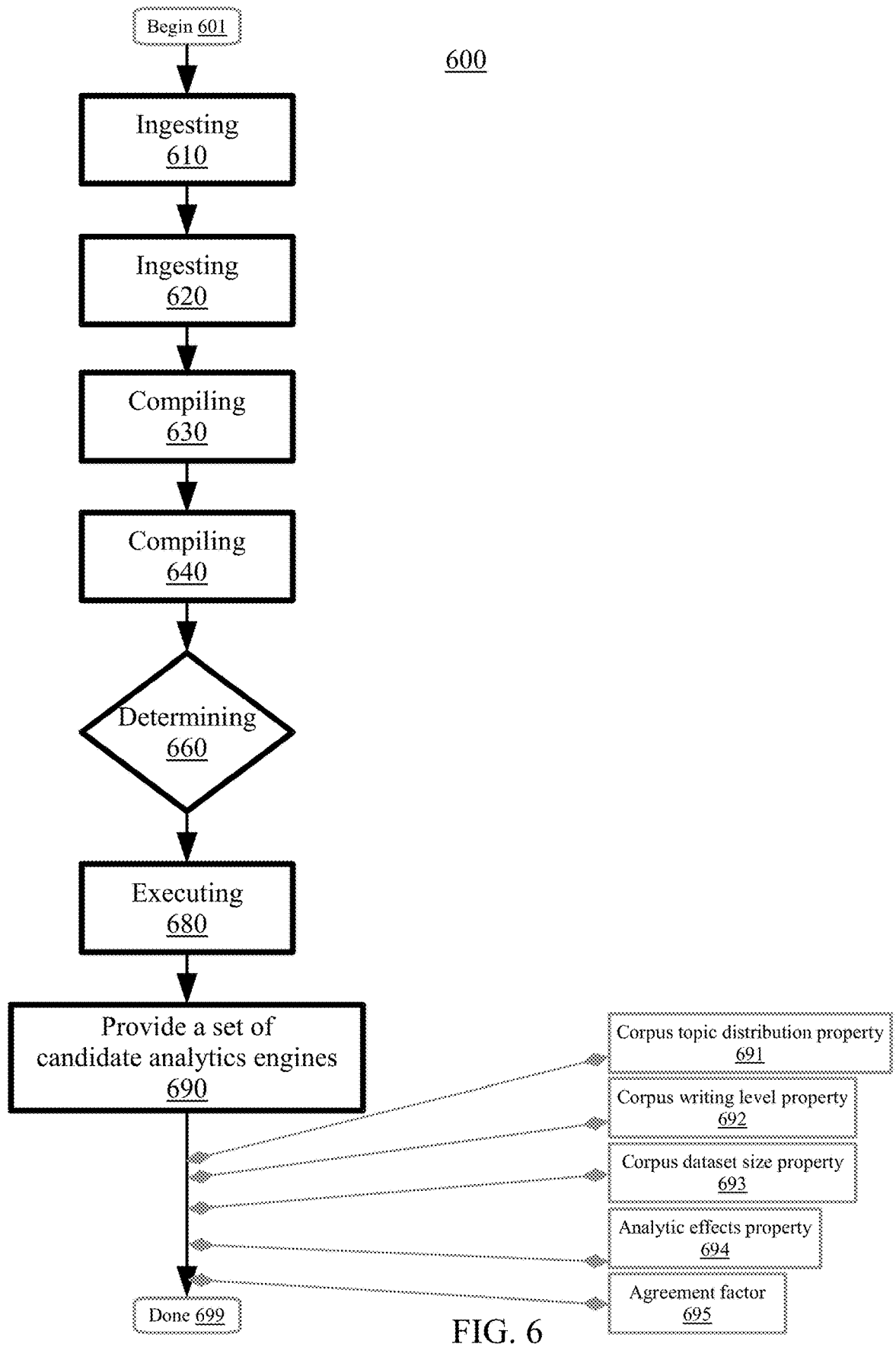
FIG. 6 is a flowchart illustrating yet another method for analytics engine selection management, according to embodiments.

FIG. 6 is a flowchart illustrating yet another method 600 for analytics engine selection management. Aspects may be similar or the same as aspects of method 400/500, and aspects may be used interchangeably. The method 600 may begin at block 601. At block 610, a set of reference data may be ingested. The ingesting may be performed by a first analytics engine. The ingesting may occur to compile a first set of characteristic data for the first analytics engine with respect to the set of reference data. At block 620, the set of reference data may be ingested. The ingesting may be performed by a second analytics engine. The ingesting may occur to compile a second set of characteristic data for the second analytics engine with respect to the set of reference data. At block 630, the first set of characteristic data for the first analytics engine may be compiled. The compiling may occur with respect to the set of reference data. At block 640, the second set of characteristic data for the second analytics engine may be compiled. The compiling may occur with respect to the set of reference data. At block 660, a set of distinct attributes may be determined. The determining may occur based on the first and second sets of characteristic data. The set of distinct attributes may relate to the first and second analytics engines. At block 680, an analytics engine selection operation may be executed. The executing may occur using the set of distinct attributes related to the first and second analytics engines.

At block 690, a set of candidate analytics engines may be provided (e.g., to a user, without a user) to execute the analytics engine selection operation. The set of candidate analytics engines may relate to the first and second analytics engines. Generally, providing can include displaying, showing, relaying, conveying, communicating, transmitting, indicating, or presenting the set of candidate analytics engines to the user to execute the analytics engine selection operation. The set of candidate analytics engines may include a collection or group of potential analytics engines for utilization with respect to a particular task, function, or operation. For instance, the set of candidate analytics engines may include the first and second analytics engines, suggested/recommended analytics engines (e.g., analytics engines expected/predicted to be associated with positive impacts), analytics engines related to either the first or second analytics engines (e.g., same family of analytics, newer/updated version of one of the evaluated analytics engines), or the like. In embodiments, providing the set of candidate analytics engines may include presenting a comparative analysis (e.g., visual representation in a graphical user interface) of the strengths and weaknesses (e.g., pros and cons) of each analytics engine of the set of candidate analytics engines. As an example, the comparative analysis may indicate computing cost data, resource usage data, precision-indicative data, recall-indicative data, typological data, error-event data, text descriptions of suggested uses for each analytic, and expected performance of each analytics engine of the set of candidate analytics engines based on the set of distinct attributes. In embodiments, the comparative analysis may include a logic diagram (e.g., Venn diagram) configured to illustrate the possible logical relations between one or more candidate analytics engines and a set of reference data. For instance, the logical diagram may depict the results that were only identified by a first analytics engine in a first circle, the results that were only identified by a second analytics engine in a first circle, and results that were identified by both the first and second analytics engines in an overlapping area between the first and second circles (e.g., to illustrate the similarities and differences between the performance of each analytics engine). As described herein, in embodiments, a user may select one or more analytics engines of the set of candidate analytics engines for utilization with respect to an application, task, function, or operation. Other methods of providing the set of candidate analytics engines to a user to execute the analytics engine selection operation are also possible.

In embodiments, the set of candidate analytics engines may be arranged at block 691. The arranging may occur based on a corpus topic distribution property. Generally, arranging can include ordering, weighting, sorting, categorizing, classifying, structuring, rank-ordering, or otherwise organizing the set of candidate analytics engines based on the corpus topic distribution property. Aspects of the disclosure relate to the recognition that, in some situations, different analytics engines may be more suitable for analyzing corpora related to different subject matters. The corpus topic distribution property may include an indication of the expected degree of performance of a particular analytics engine with respect to different topics (e.g., subject matters, themes, data typologies). For instance, the corpus topic distribution property may be expressed as a set of scores (e.g., integers between 0 and 100) indicating the proficiency of a particular analytics engine with respect to different topics. As an example, the corpus topic distribution property may indicate that a particular analytics engine is associated with a score of 31 with respect to a topic of "politics," a score of "52" with respect to a topic of "history," a score of 48 with respect to a topic of "Renaissance Art" and a score of "87" with respect to a topic of "chemistry." In embodiments, the set of candidate analytics engines may be arranged based on the corpus topic distribution property. For instance, arranging the set of candidate analytics engines may include ranking the set of candidate analytics engines based on the score of each candidate analytics engine with respect to a particular topic (e.g., analytics engines with higher scores in a topic of "chemistry" may be ranked more highly). As another example, arranging the set of candidate analytics engines may include ranking the set of candidate analytics engines based on which analytics engines cover the widest range/greatest number of topics, which analytics engines have the highest average score, or the like. Other methods of arranging the set of candidate analytics engines based on the corpus topic distribution property are also possible.

In embodiments, the set of candidate analytics engines may be arranged at block 692. The arranging may occur based on a corpus writing level property. Generally, arranging can include ordering, weighting, sorting, categorizing, classifying, structuring, rank-ordering, or otherwise organizing the set of candidate analytics engines based on the corpus writing level property. Aspects of the disclosure relate to the recognition that, in some situations, different analytics engines may be more suitable for analyzing corpora of different writing levels. The corpus writing level property may include an indication of the expected degree of performance of a particular analytics engine with respect to different standards, formats, or qualities of textual content (e.g., formal writing, standard writing, figurative writing, poetic writing, informal writing, old/historical/ancient writing, slang, technical writing, legal writing, non-native writing). In embodiments, the corpus writing level property may be expressed as a set of scores (e.g., integers between 0 and 100) indicating the proficiency of a particular analytics engine with respect to different writing levels. As an example, the corpus writing level property may indicate that a particular analytics engine configured to identify parts of speech of a text is associated with a score of "13" with respect to "slang writing" (e.g., textual content written in a very information fashion, such as data from social media or internet message boards), but a score of "94" with respect to "standard writing" (e.g., textual content written in an everyday manner, such as data from a newspaper or article). In embodiments, the set of candidate analytics engines may be arranged based on the corpus writing level property. For instance, arranging the set of candidate analytics engines may include ranking the set of candidate analytics engines based on the score of each candidate analytics engine with respect to a particular writing level (e.g., analytics engines with higher scores for a writing level of "technical writing" may be ranked more highly). As another example, arranging the set of candidate analytics engines may include ranking the set of candidate analytics engines based on which analytics engines cover the widest range/greatest number of writing levels, which analytics engines have the highest average score, or the like. Other methods of arranging the set of candidate analytics engines based on the corpus writing level property are also possible.

In embodiments, the set of candidate analytics engines may be arranged at block 693. The arranging may occur based on a corpus dataset size property. Generally, arranging can include ordering, weighting, sorting, categorizing, classifying, structuring, rank-ordering, or otherwise organizing the set of candidate analytics engines based on the corpus dataset size property. Aspects of the disclosure relate to the recognition that, in some situations, different analytics engines may be more suitable for analyzing corpora of different dataset sizes. The corpus dataset size property may include an indication of the expected degree of performance of a particular analytics engine with respect to the size of a target corpus (e.g., file size, length, number of letters, words). In embodiments, the corpus dataset size property may be expressed as a set of scores (e.g., integers between 0 and 100) indicating the proficiency of a particular analytics engine with respect to different corpora sizes. In certain embodiments, the corpus dataset size property may be expressed as a range of time values indicating the length of time for a particular analytics engine to complete analysis of corpora of different data sizes. As an example, the corpus data size property may indicate that a particular analytics engine configured to perform sentiment analysis of a corpus having 12,383 words completed the task in 4 seconds, while a corpus having 75,961 words took 59 seconds (e.g., 14.75 times longer to parse a corpus roughly 6 times the size). In embodiments, the set of candidate analytics engines may be arranged based on the corpus data size property. For instance, arranging the set of candidate analytics engines may include ranking the set of candidate analytics engines based on the completion time to perform an analysis operation on corpora of different sizes (e.g., analytics engines with lower completion times may be ranked more highly). As another example, arranging the set of candidate analytics engines may include calculating a corpora data size scaling factor (e.g., quantitative measure of how well a given analytics engine maintains efficiency as corpora increase in data size), and ranking the set of candidate analytics engines based on which analytics engines have the superior corpora data size scaling factor (e.g., indicating greater flexibility/versatility). Other methods of arranging the set of candidate analytics engines based on the corpus data size property are also possible.

In embodiments, the set of candidate analytics engines may be arranged at block 694. The arranging may occur based on an analytic effects property. Generally, arranging can include ordering, weighting, sorting, categorizing, classifying, structuring, rank-ordering, or otherwise organizing the set of candidate analytics engines based on the analytic effects property. Aspects of the disclosure relate to the recognition that, in some situations, analytics engines may have varying degrees of effectiveness based on the type and nature of analytic engines previously run on a data set. The analytic effects property may include an indication of the degree of dependency or reliance of a particular analytics engine on the results of a previously run analytics engine. In embodiments, the analytics effect property may be expressed as a set of scores (e.g., integers between 0 and 100) indicating the degree or extent to which a particular analytics engine is dependent upon, reliant upon, or affected by the results/outcome of a previously run analytics engine. As an example, the analytics effects property may indicate that a particular analytics engine of a "Proper Noun Identifier" has an analytics effect property of "93" (e.g., indicating high reliance/dependency) with respect to an analytics engine of "Part of Speech Tagger" (e.g., the "Proper Noun Identifier" uses the results of the "Part of Speech Tagger" to identify the proper nouns). In embodiments, the set of candidate analytics engines may be arranged based on the analytics effects property. For instance, arranging the set of candidate analytics engines may include ranking each candidate analytics engine based on its analytics effects property score (e.g., analytics engines with lower degrees of dependency on previous analytics engines may be ranked more highly). As another example, arranging the set of candidate analytics engines may include ranking the set of candidate analytics engines based on which analytics engines are compatible with the widest range/greatest number of other analytics engines. Other methods of arranging the set of candidate analytics engines based on the analytics effects property are also possible.

In embodiments, the set of candidate analytics engines may be arranged at block 695. The arranging may occur based on an agreement factor between a single analytics engine of the set of candidate analytics engines and a remainder of the set of candidate analytics engines other than the single analytics engine. Generally, arranging can include ordering, weighting, sorting, categorizing, classifying, structuring, rank-ordering, or otherwise organizing the set of candidate analytics engines based on the agreement factor. Aspects of the disclosure relate to the recognition that, in some situations, analytics engines may produce results or outcomes that agree or disagree with the results of other analytics engines. The agreement factor may include an indication of the degree or extent to which the result produced by a single analytics engine agrees with (e.g., matches, corresponds with, is similar to) or disagrees with (e.g., diverges from, deviates from, is different from) the result produced by other analytics engines of the set of candidate analytics engines. In embodiments, the agreement factor may be expressed as a set of scores (e.g., integers between 0 and 100, percentage) indicating the degree or extent to which a result of a particular analytics engine matches or mismatches the result of one or more other analytics engines of the set of analytics engines. As an example, consider that a first analytics engine configured to identify all names of potential allergens that are listed in a medical form returns a result of "peanuts, shellfish, gluten, pollen," whereas a second analytics engine that parses the same medical form returns a result of "peanuts, shellfish, gluten, pollen, dairy, bees." Accordingly, the agreement factor may indicate a score of "66.7%" for the first analytics engine with respect to the second analytics engine (e.g., the first analytics engine identified 4 of the 6 allergens identified by the second analytics engine). In embodiments, the set of candidate analytics engines may be arranged based on the agreement factor. For instance, arranging the set of candidate analytics engines may include ranking each candidate analytics engine based on its agreement factor with respect to each other analytics engine of the set of candidate analytics engines (e.g., analytics engines with higher degrees of agreement may be ranked more highly). As another example, arranging the set of candidate analytics engines may include ranking the set of candidate analytics engines based on which analytics engines achieve the greatest agreement factor with respect to a set of ground truth data. In certain embodiments, ranking the set of candidate analytics engines may include ranking the set of candidate analytics engines based on a set of historical agreement factor data (e.g., an analytics engine that does not achieve the highest achievement factor on a single operation may be ranked based on its history of agreement factors for similar operations). Other methods of arranging the set of candidate analytics engines based on the agreement factor are also possible.

Method 600 concludes at block 699. As described herein, aspects of method 600 relate to analytics engine selection management. Aspects of method 600 may provide performance or efficiency benefits related to analytics engine selection management. Leveraging a comparative analysis of analytics engines may be associated with benefits such as analytic performance, accuracy, and compatibility. Aspects may save resources such as bandwidth, processing, or memory.

FIG. 7 depicts an example visual interface 700 for selection of a set of analytics engines for comparison, according to embodiments. Aspects of the disclosure relate to the recognition that choosing an analytics engine for a particular task or purpose may be associated with challenges, as it may be unclear how various analytics engines may perform with respect to a target data set (e.g., selecting an analytic without taking the properties and resource constraints of the target data set into account may lead to wasted resources or invalid results). As such, aspects of the disclosure relate to performing a comparative analysis of analytics engines that takes into account the properties and attributes of target data sets. Accordingly, FIG. 7 illustrates a visual interface 700 for selecting two or more analytics engines for comparison. In embodiments, a user may check boxes of the visual interface 700 to indicate the analytics engines he/she would like to compare. In certain embodiments, a plurality of analytics engines may be automatically selected for comparison based on a set of reference data (e.g., the user wishes to identify analytics engines associated with positive performance with respect to a given set of reference data). Other methods of using the example visual interface 700 to select analytics engines for comparison are also possible.

FIG. 8 depicts another example visual interface 800 for selection of a set of analytics engines for comparison, according to embodiments. Aspects of FIG. 8 relate to selecting a plurality of analytics engines for comparison from a list of available analytics engines. In embodiments, each of the analytics engines of the list of available analytics engines may include a different type of analytics engine configured to analyze a corpus of text for instances of positive sentiment. As described herein, two or more analytics engines may be selected for comparison with respect to one another. For example, as shown in FIG. 8, an analytics engine of "Analytic #1" 810 and "Analytic #5" 820 may be selected for comparison. Other methods of using the example visual interface 800 to select analytics engines for comparison are also possible.

FIG. 9 depicts an example visual interface 900 for selection of a set of parameters for use to compare a set of analytics engines, according to embodiments. The set of parameters may include sets of reference data to be processed by the set of analytics engines (e.g., the analytics engines selected in FIG. 8), reference hardware (e.g., virtual machines, logical partitions) on which to perform the analysis, or other settings. As shown in FIG. 9, the example visual interface 900 may include a data set selection window 910. The data set selection window 910 may include a graphical menu configured to enable selection of one or more sets of reference data to be ingested and processed by the set of analytics engines. For example, one or more sets of product reviews may be selected as the sets of reference data to be parsed by the set of analytics engines (e.g., to identify instances of positive sentiment with respect to a product). Aspects of the disclosure relate to the recognition that different hardware configurations may have different performance characteristics which may influence the results of the comparison (e.g., a virtual machine deployed in a cloud may have limited input/output bandwidth that would yield different results than a bare metal environment). Accordingly, in embodiments the example visual interface 900 may include a reference hardware selection window 920. The reference hardware selection window 920 may include a graphical menu configured to enable selection of a hardware configuration (e.g., physical or virtual) on which to perform the comparative analysis of the set of analytics engines. Accordingly, the reference hardware configuration selected in the reference hardware selection window 920 may be used as an operating environment in which to evaluate the set of analytics engines. In embodiments, the example visual interface 900 may include an analytics engine comparison results display 930. The analytics engine comparison results display 930 may be populated with information regarding the memory usage, CPU usage, run time, precision, and other statistics in response to performance of the comparison between the set of analytics engines. Other methods of using the example visual interface 900 for selection of a set of parameters for use to compare a set of analytics engines are also possible.

Figure 10:
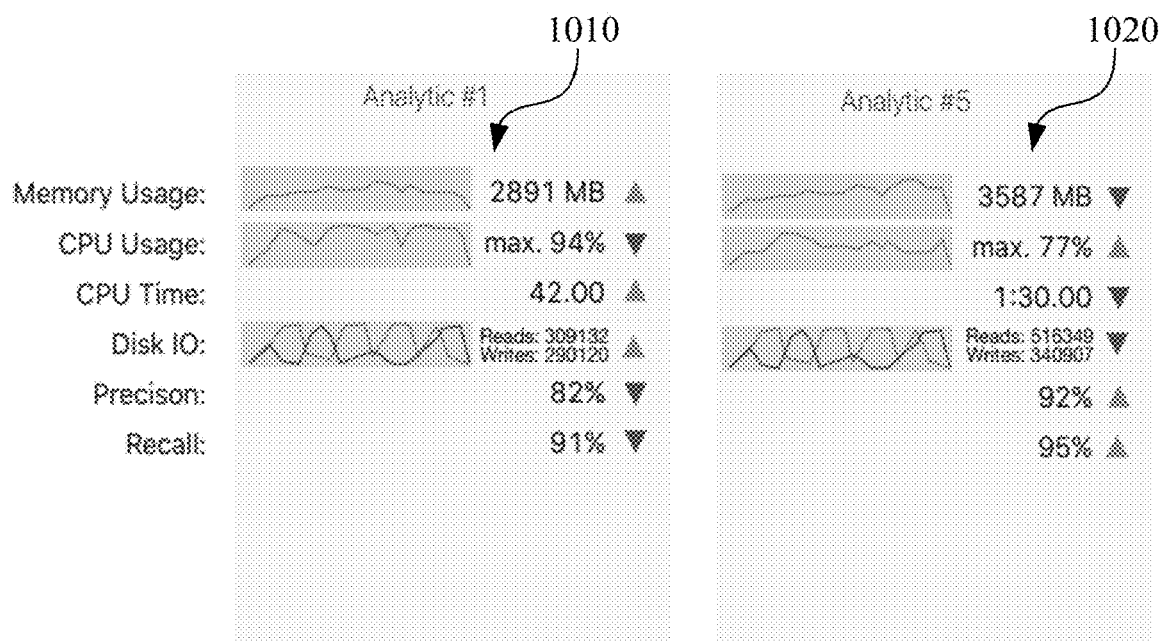
FIG. 10 depicts an example analytics engine comparison results display for displaying a set of characteristic data for a set of analytics engines, according to embodiments.

FIG. 10 depicts an example analytics engine comparison results display 1000 for displaying a set of characteristic data for a set of analytics engines, according to embodiments. As described herein, aspects of the disclosure relate to using the set of analytics engines to process or analyze a set of reference data, and generate (e.g., compile) a set of characteristic data to characterize the performance of each analytics engine to facilitate comparison of the set of analytics engines. As shown in FIG. 10, the example analytics engine comparison results display 1000 may include a first set of characteristic data 1010 for a first analytics engine and a second set of characteristic data 1020 for a second analytics engine. The first and second sets of characteristic data 1010, 1020 may include collections of properties, traits, attributes, factors, or other aspects that characterize the behavior or performance of the first and second analytics engines with respect to the set of reference data, respectively. As shown in FIG. 10, the first set of characteristic data 1010 and the second set of characteristic data 1020 may indicate the memory usage, CPU usage, CPU time, disk input/output, precision, and recall for each of the analytics engines with respect to the set of reference data. As described herein, the first set of characteristic data 1010 and the second set of characteristic data 1020 may be used to facilitate selection of one or the analytics engines for utilization with respect to a task, function, or operation. As an example, for an operation that requires a high level of accuracy, "Analytic #5" may be selected for utilization (e.g., due to the greater precision and recall rates). As another example, for an operation that requires expediency, "Analytic #1" may be selected for utilization (e.g., due to the lower CPU time; faster completion). Other methods of analytics engine selection management are also possible.

In embodiments, aspects of the disclosure relate to identifying an analytics engine that is expected to be associated with positive performance, efficiency, or effectiveness with respect to a particular set of reference data. For instance, in embodiments, a particular set of reference data may be selected, and an analytics engine selection management module may be configured to automatically run a series of candidate analytics engines with respect to the particular set of reference data until an appropriate analytics engine (e.g., associated with performance characteristics above a threshold) is identified. In certain embodiments, the analytics engine selection management module may be configured to monitor a list of available analytics engines, identify a particular analytics engine that achieves an analytics engines selection criteria (e.g., precision above a threshold, completion time below a threshold), and provide a notification of the particular analytics engine to a user. As an example, a user may configure the analytics engine selection management module to provide a notification in response to identifying an analytics engine that is more suitable (e.g., superior performance in one or more categories) for a particular task than an analytics engine currently used by the user. Accordingly, the analytics engine selection management module may provide (e.g., present, transmit, display) notification of the identified analytics engine to the user. Other methods of analytics engine selection management are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for comparing and selecting one analytics engine from a plurality of analytic engines, the method comprising:
   ingesting and processing a set of reference data by a first analytics engine to compile a first set of characteristic data for the first analytics engine with respect to the set of reference data;
   ingesting and processing the set of reference data by a second analytics engine to compile a second set of characteristic data for the second analytics engine with respect to the set of reference data;
   compiling the first set of characteristic data for the first analytics engine with respect to processing the set of reference data, wherein the first set of characteristic data comprises a collection of properties, traits, attributes, or factors that characterize the behavior of the first analytics engine with respect to the set of reference data;
   compiling the second set of characteristic data for the second analytics engine with respect to processing the set of reference data, wherein the second set of characteristic data comprises a collection of properties, traits, attributes, or factors that characterize the behavior of the second analytics engine with respect to the set of reference data;
   comparing the first set of characteristic data against the second set of characteristic data to determine a set of distinct attributes for each of the first and second analytics engines, wherein the respective sets of distinct attributes distinguish the first analytics engine from the second analytics engine with respect to the set of reference data;
   selecting one of the first or second analytics engines based on the set of distinct attributes for the first and second analytics engines; and
   processing a set of content data to generate a valid results-set using the selected analytics engine.

2. The method of claim 1, wherein the set of distinct attributes for each of the first and second analytics engines comprises a subset of characteristics selected from the first and second sets of characteristic data.

3. The method of claim 1, wherein the set of content data comprises a larger data set from which the set of reference data was extracted, a data set that shares one or more characteristics with the set of reference data, or a subset of the set of reference data.

4. The method of claim 1, further comprising:
   providing the set of distinct attributes to a user.

5. The method of claim 1, further comprising:
   structuring the set of reference data to include:
      a domain,
      a set of substantive content information, and
      a set of constraints.

6. The method of claim 1, further comprising:
   resolving a set of computing cost data for the first and second analytics engines to determine the set of distinct attributes related to the first and second analytics engines, wherein selecting one of the first or second analytics engines is further based on the set of computing cost data for the first and second analytics engines.

7. The method of claim 1, further comprising:
   resolving a set of resource usage data for the first and second analytics engines to determine the set of distinct attributes related to the first and second analytics engines, wherein selecting one of the first or second analytics engines is further based on the set of resource usage data for the first and second analytics engines.

8. The method of claim 1, further comprising:
   resolving a set of precision-indicative data for the first and second analytics engines to determine the set of distinct attributes related to the first and second analytics engines, wherein selecting one of the first or second analytics engines is further based on the set of precision-indicative data for the first and second analytics engines.

9. The method of claim 1, further comprising:
   resolving a set of recall-indicative data for the first and second analytics engines to determine the set of distinct attributes related to the first and second analytics engines, wherein selecting one of the first or second analytics engines is further based on the set of recall-indicative data for the first and second analytics engines.

10. The method of claim 1, further comprising:
    resolving a set of typological data for the first and second analytics engines to determine the set of distinct attributes related to the first and second analytics engines, wherein selecting one of the first or second analytics engines is further based on the set of typological data for the first and second analytics engines.

11. The method of claim 1, further comprising:
    resolving a set of error-event data for the first and second analytics engines to determine the set of distinct attributes related to the first and second analytics engines, wherein selecting one of the first or second analytics engines is further based on the set of error-event data for the first and second analytics engines.

12. A computer-implemented method for comparing and selecting one analytics engine from a plurality of analytic engines, the method comprising:
    ingesting a set of reference data by a first analytics engine to compile a first set of characteristic data for the first analytics engine with respect to the set of reference data;

ingesting the set of reference data by a second analytics engine to compile a second set of characteristic data for the second analytics engine with respect to the set of reference data;

compiling the first set of characteristic data for the first analytics engine with respect to the set of reference data, wherein the first set of characteristic data comprises a collection of properties, traits, attributes, or factors that characterize the behavior of the first analytics engine with respect to the set of reference data;

compiling the second set of characteristic data for the second analytics engine with respect to the set of reference data, wherein the second set of characteristic data comprises a collection of properties, traits, attributes, or factors that characterize the behavior of the second analytics engine with respect to the set of reference data;

comparing the first set of characteristic data against the second set of characteristic data to determine a set of distinct attributes for each of the first and second analytics engines, wherein the respective sets of distinct attributes comprise a set of computing cost data, a set of resource usage data, a set of precision-indicative data, a set of recall-indicative data, a set of typological data, and a set of error-event data;

providing a set of candidate analytics engines to a user, wherein the set of candidate analytics engines includes the first and second analytics engines, suggested or recommended analytics engines, or analytics engines related to either the first or second analytics engines;

selecting one analytics engine from the set of candidate analytics engines based on the set of distinct attributes for the first and second analytics engines; and processing a set of content data to generate a valid results-set using the selected analytics engine, wherein the set of content data is related to the set of reference data.

13. The method of claim 12, wherein the set of content data comprises a larger data set from which the set of reference data was extracted, a data set that shares one or more characteristics with the set of reference data, or a subset of the set of reference data.

14. The method of claim 12, further comprising:
providing the set of distinct attributes to the user.

15. The method of claim 12, further comprising:
structuring the set of reference data to include:
a domain,
a set of substantive content information, and
a set of constraints.

16. The method of claim 12, further comprising:
arranging the set of candidate analytics engines based on a corpus topic distribution property, a corpus writing level property, a corpus dataset size property, or an analytic effects property.

17. The method of claim 12, further comprising:
arranging the set of candidate analytics engines based on an agreement factor between a single analytics engine of the set of candidate analytics engines and a remainder of the set of candidate analytics engines other than the single analytics engine.

\* \* \* \* \*